United States Patent [19]

Cook, Jr.

[11] Patent Number: 4,787,165
[45] Date of Patent: Nov. 29, 1988

[54] ARTIFICIAL BAIT FEEDING APPARATUS

[75] Inventor: Harold T. Cook, Jr., Bainbridge Island, Wash.

[73] Assignee: Marco Seattle, Inc., Seattle, Wash.

[21] Appl. No.: 71,119

[22] Filed: Jul. 8, 1987

[51] Int. Cl.⁴ ............................................. A01K 79/00
[52] U.S. Cl. ........................................ 43/4; 43/27.4; 43/44.83
[58] Field of Search ................. 43/4, 27.4, 44.83

[56] References Cited

U.S. PATENT DOCUMENTS

| | | | |
|---|---|---|---|
| 1,530,387 | 3/1925 | Marra | 221/253 |
| 2,511,828 | 6/1950 | Andrist | 43/4 |
| 2,518,590 | 8/1950 | Andrist | 43/4 |
| 3,411,176 | 11/1968 | Holly | 17/32 |
| 3,626,630 | 12/1971 | Tison | 43/4 |
| 3,841,011 | 10/1974 | Tison | 43/4 |
| 3,999,324 | 12/1976 | Wagner | 43/4 |
| 4,000,831 | 1/1977 | House | 221/246 |
| 4,250,648 | 2/1981 | Jacobsen | 43/4 |
| 4,354,323 | 10/1982 | Huff | 43/4 |
| 4,437,254 | 3/1984 | Fancey et al. | 43/4 |
| 4,477,992 | 10/1984 | Lang et al. | 43/4 |
| 4,567,684 | 2/1986 | Bjorshol | 43/4 |
| 4,641,452 | 2/1987 | Bjorshol | 43/27.4 |
| 4,648,193 | 3/1987 | Alex et al. | 43/4 |
| 4,704,815 | 11/1987 | Poirier et al. | 43/4 |

Primary Examiner—M. Jordan
Attorney, Agent, or Firm—Christensen, O'Connor, Johnson & Kindness

[57] ABSTRACT

Three different apparatus for feeding artificial bait are disclosed. One feeds individual bait size pieces from a stack of such pieces. A second feeds elongated strips from a stack of strips to a baiting station and cuts incremental pieces presented at the baiting station. A third apparatus feeds a continuous, elongated strip of bait wound onto a reel to a baiting station and cuts incremental pieces presented at the baiting station.

7 Claims, 2 Drawing Sheets

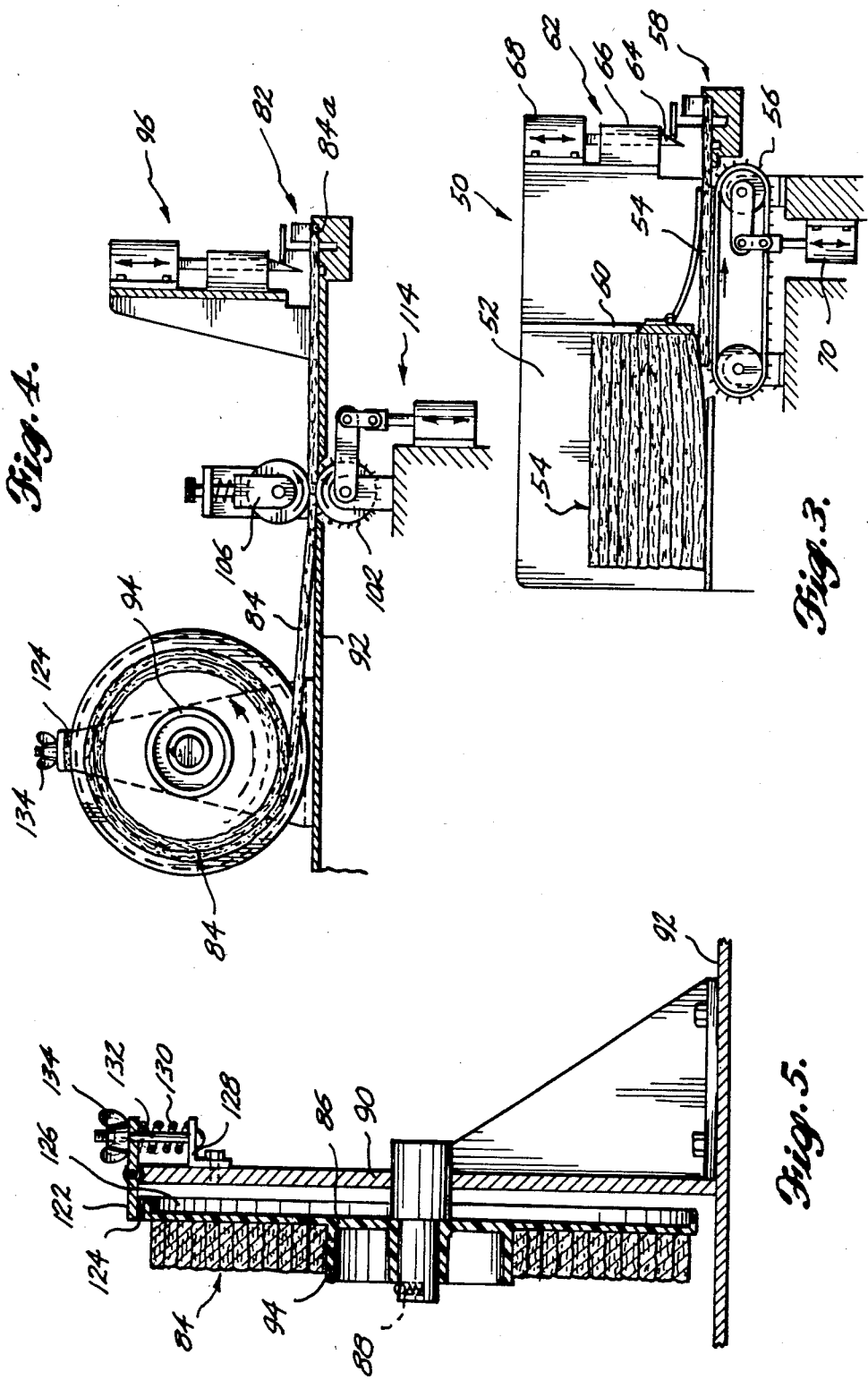

ARTIFICIAL BAIT FEEDING APPARATUS

TECHNICAL BACKGROUND OF THE INVENTION

The present invention relates to an apparatus for feeding bait to an automatic baiting machine, and more particularly to an apparatus for feeding artificial bait to an automatic baiting machine.

BACKGROUND OF THE INVENTION

Longlines are utilized in the fishing industry to fish for bottom fish and other food fish throughout the world. A longline comprises a groundline having a length on the order of from a few hundred to several hundred meters. Gangions (or leaders) are affixed to the groundline at successive locations normally spaced on the order of one meter or more from each other. Fish hooks are affixed to the free ends of the gangions. These hooks are pulled by their gangions through a baiting station of an automatic baiting machine, where in the past, chunks of natural bait have been positioned for capture by the hooks. While natural bait is of course an excellent bait for attracting and hooking bottom fish the fishermen seek, artificial bait tends to deteriorate with time in the water. Moreover, artificial bait is difficult and expensive to store, whether it is live or frozen, and is rather messy to cut and feed to a baiting station and also to clean from a hook when the longline has been retrieved. As a consequence, the fishing industry is looking more at artificial bait that has the attracting power of natural bait, that preferably can be stored at room temperature, and that is relatively easy to handle. Where artificial bait can be hand-fed to baiting machines that already exist, little time or effort has been expended in developing means for storing, transporting, handling, and feeding artificial bait to a baiting machine.

SUMMARY OF THE INVENTION

The present invention provides two basic embodiments for feeding artificial bait to a baiting station. The first comprises a means for holding a stack of bait pieces adjacent a baiting station. The holding means has a bottom and an opening adjacent the bottom and the baiting station for allowing a piece of bait to be moved transversely from the bottom of the stack to the baiting station. A means for moving the bottom piece of bait from the stack and transferring it to the baiting station is provided. A means for biasing the stack of bait toward the bottom is also provided so that when the bottom piece of bait is removed from the stack, the stack will index toward the bottom to replace the just-removed piece of bait. This apparatus allows bait pieces to be stacked, placed in a container, and stored for easy transfer from storage to the feeding apparatus. A rectangular cross-section is preferred for the bait pieces so that they can be efficiently stored and stacked.

In another aspect of the invention, a means for holding a continuous, elongated strip of bait is provided. A means for feeding incremental portions of the strip from the holding means to a baiting station and means for severing incremental portions of the strip for use at the baiting station are also provided. This apparatus preferably includes a holding reel on which an elongated strip of artificial bait can be wound. Reel storage of the bait is the most efficient volumetric storage of bait. The reels can be stored in rectangular boxes and again stacked and stored in an efficient manner.

BRIEF DESCRIPTION OF THE DRAWINGS

A better understanding of the present invention can be derived from reading the ensuing specification in conjunction with the accompanying drawings wherein:

FIG. 3 is an alternate to the apparatus shown in FIG. 1 in which the bait is received by the feeding apparatus in a stack of elongated strips;

FIG. 4 is an apparatus for feeding incremental portions of an elongated, continuous strip of bait to a baiting station; and FIG. 5 is an enlarged end-elevational view of the apparatus shown in FIG. 4.

DETAILED DESCRIPTION OF THE INVENTION

Artificial bait for luring and hooking bottom fish and other food fish comes in a variety of types and structures. Normally, the bait comprises a porous substrate that is filled with a material containing a fish attractant or material which makes the artificial bait simulate real bait. The substrate usually provides the bait with structural integrity so that the bait will resist mechanical wear after it is positioned on a hook. Specifically, one such artificial bait comprises a gelatinized material in admixture with an attractant substance that is incorporated into and reinforced by a mat of fibrous material. Bait of this type can be molded into square, relatively flat pieces, for example, on the order of two by two by one-half or into elongated, rectangular, flat pieces on the order of, for example, two by twelve by one-half inches. Depending upon the admixture of gelatinized material, the bait pieces can be made relatively solid or can be made flexible in their minor dimension. Therefore, long, continuous strips of bait can also be produced and wrapped onto a reel, which is one of the most efficient modes of storage.

Whether the bait material is formed in squares, elongated strips, or continuous strips, each of these forms can be packaged in boxes or other containers that are easily stacked and secured in the deck or hold of a ship. Each can also be easily removed and inserted onto an appropriate machine for feeding the bait to automatic baiting machines.

Figure 1:
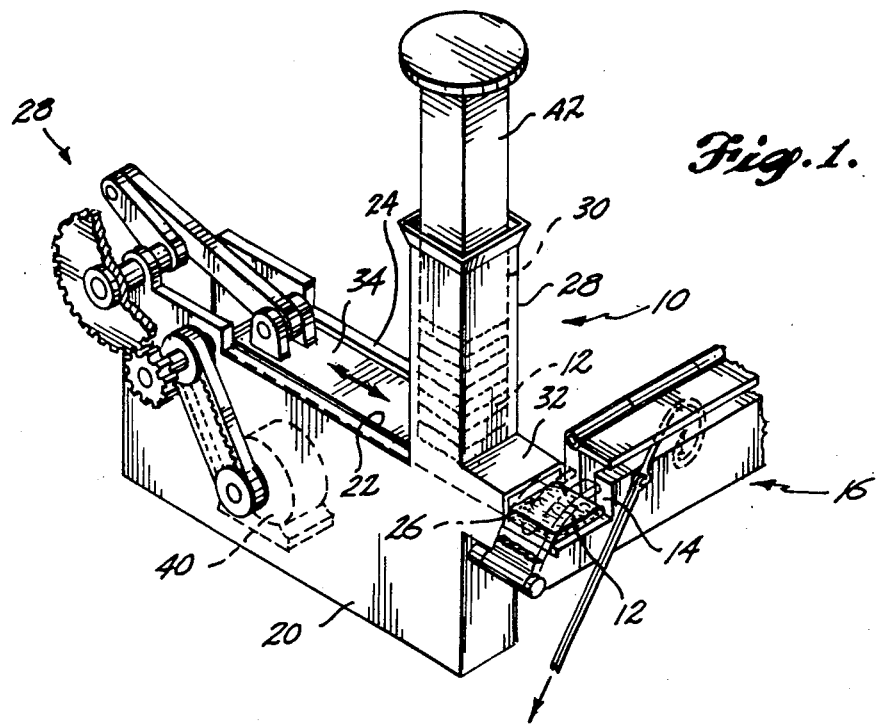
FIG. 1 is an isometric view of a baiting device for feeding rectangular stacks of bait to a baiting station.
Figure 2:
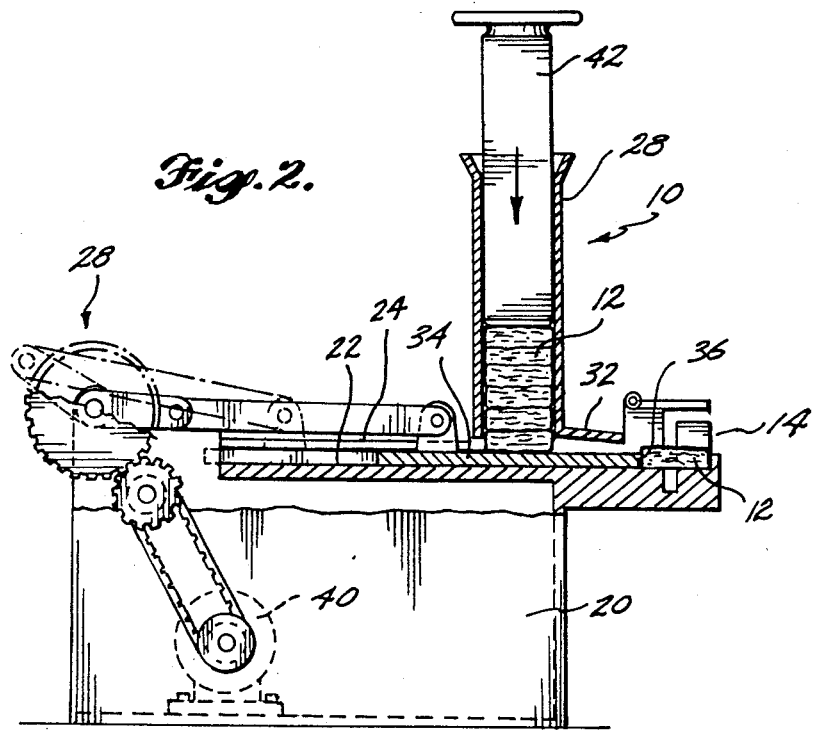
FIG. 2 is a side-elevational view of the apparatus shown in FIG. 1.

Referring to FIGS. 1 and 2, a feeding apparatus 10 for feeding square, relatively flat pieces of artificial bait 12 to a baiting station 14 that is part of an automatic baiting machine 16. The baiting machine is not wholly shown in the figures; however, such a baiting machine is known in the art. For example, see the circle hook baiter disclosed in U.S. Pat. No. 4,648,193, issued Mar. 10, 1987, expressly incorporated herein by reference. Because the baiter and baiting station form no part of the present invention, no further description of that apparatus will be given.

The feeding apparatus 10 includes a base 20 having an elongated trough 22 formed in its upper surface 24. The trough terminates in an end 26 adjacent the baiting station 14. A storage magazine 28 is positioned adjacent the baiting station 14 and located in an upright orientation over the trough 22. The magazine 28 has a rectangular upright channel 30 that opens onto the upper end of the magazine 28 and that extends downwardly and opens into the trough 22. While the magazine 28 could be positioned immediately adjacent the baiting station 14, in this embodiment it is spaced slightly upstream from the baiting station. A cover 32 is positioned over the trough 22 between the magazine 28 and the baiting station 14. A reciprocating plate 34 is positioned in the trough 22 upstream from the magazine 28. The reciprocating plate 34 has a forward end 36 that reciprocates from a position entirely upstream of the magazine 28 to a position immediately adjacent the baiting station 14. The plate 34 is reciprocated by a reciprocating drive mechanism generally designated 38 of conventional design driven by a prime mover 40. The drive mechanism 38 is constructed in a conventional matter so that when it is actuated, it will reciprocate the plate 34 through one complete cycle to move a piece of bait from the magazine to the baiting station, and then stoop the plate to await further actuation.

In operation, the lowermost piece 12 of bait in the magazine 28 rests on the bottom surface of the trough 22 under the magazine. The reciprocating plate is withdrawn from beneath the magazine when at rest after a complete cycle. A weight 42 is positioned on top of the stack of bait to bias the entire stack of bait in a downward direction toward the bottom of the magazine 28. When the baiting machine 16 provides a signal to the reciprocating drive mechanism 38 calling for a piece of bait, the drive mechanism is actuated and the reciprocating plate 34 is moved so that the forward end 36 of the plate engages the rearward edge of a piece of bait and moves it along the trough 22 to the baiting station 14. The plate then reciprocates back to its original position at which time the drive mechanism 38 is deactuated. As the plate 34 moves out from under the magazine 28 the weight 42 biases the stack of pieces 12 bait downwardly so that a next successive piece of bait is situated on the upper surface of the trough 22. In this manner, when the baiting machine 16 again calls for another piece of bait to be positioned in the baiting station 14, the actuating drive mechanism 38 can again be actuated to reciprocate the plate 34 out of the magazine 28 to move the next bottom piece of bait to the baiting station.

While it is well within the purview of one of ordinary skill, a variety of mechanisms can be utilized to actuate or reciprocate the plate 34. For example, a stepping motor can be utilized that is energized for a sufficiently long period of time to cause the plate to reciprocate through a full cycle. Alternatively, clutch mechanisms can be employed to engage and disengage an appropriate gear train as needed. Again, the design and execution of a reciprocating assembly is certainly within the capabilities of one of ordinary skill in this particular technology.

Referring to FIG. 3, an alternative embodiment to that shown in FIGS. 1 and 2 is illustrated in side-elevation. In this apparatus, generally designated 50, the magazine 52 carries a plurality of elongated strips 54 of artificial bait. These strips can have the same width as those handled by the apparatus just described and illustrated in conjunction with FIGS. 1 and 2. These strips 54 are, however, elongated lengthwise. In this embodiment, a continuous toothed belt 56 has an upstream end positioned under the downstream end of the magazine 52. The downstream end of the continuous belt 56 is positioned adjacent a baiting station 58. The downstream end of the magazine 52 has an opening allowing the downstream ends of the strips 54 of bait to engage the upstream end of the toothed belt. The forward or downstream wall 60 has its lower edge positioned so as to allow only the lowermost or bottom piece of bait to be forwarded toward the baiting station. The strips above the lowermost strip are restrained by the wall 60 when the lowermost strip is advanced by the tooth belt.

A reciprocating knife assembly 62 is positioned adjacent the baiting station and between the baiting station and the downstream end of the tooth belt 56. The knife includes a blade 64 positioned for vertical reciprocating movement in a guide housing 66. A solenoid or other suitable prime mover 68 is coupled to and positioned above the knife so as to cause the knife blade to reciprocate downwardly across the path of the bait strip 54. In this manner an incremental piece of bait can be severed from the strip so that the incremental piece can be engaged by a hook and removed from the baiting station. As an incremental piece of bait is removed from the baiting station 58, the baiting machine provides a signal to the advancing mechanism 70 for the tooth belt causing it to forward the strip 54 of bait so that the downstream portion of the strip is positioned within the baiting station. Once the toothed belt 56 has advanced the strip of bait 54, a signal is provided to the prime mover 68 in a conventional manner, causing the knife blade 64 to reciprocate downwardly and sever the next incremental piece of bait. As the upstream end of the strip of bait is advanced past the forward wall 60 of the magazine 52, the next strip 56 of bait drops downwardly and engages the tooth belt and is advanced with little or no gap between strips of bait. In this manner, incremental pieces of bait can be fed to the baiting station 58 on a continuous basis, at least as long as a stack of bait strips is located in the magazine 52.

The embodiment of the artificial bait feeding apparatus shown in FIG. 3 provides the capability of feeding elongated strips of bait that can be stacked in a magazine. These strips of bait can be stored in conventional boxes that are easily stored and retrieved in a manner similar to rectangular stacks of artificial bait employed in conjunction with FIGS. 1 and 2.

A still further embodiment of the present invention is illustrated in FIGS. 4 and 5. The feeding apparatus 80 allows artificial bait to be formed and stored in an elongated, continuous strip with is then fed to a baiting station 82 in incremental amounts for use by the baiting machine. In this embodiment, an elongated strip 84 of bait is wound on a reel 86. The reel is mounted on a spindle 88 mounted on an upwardly extending flange 90 positioned on the base 92 of the feeding apparatus. The reel 86 has a central hub 94 on which the continuous, elongated strip 84 of bait is spirally coiled. The base 92 extends from the location of the reel support flange 90 to a location adjacent the baiting station. A reciprocating knife assembly 96 is mounted on the base adjacent the baiting station 82. This knife assembly 96 is similar to that described in conjunction with FIG. 3. A bait forwarding mechanism, generally designated 100, engages the strip 84 of bait and advances it incrementally into the baiting station 82 where the knife 96 severs an incremental portion 84a from the strip 84. The advancing mechanism in this embodiment of the invention comprises a lower toothed roller positioned below the base 92. The base 92 has an opening therein through which the teeth of the roller 102 can extend. An idler roller 104 is positioned above the toothed roller 102. The idler roller 104 is mounted on a yoke 106, in turn, affixed to an upwardly extending rod 108. The rod 108 extends upwardly through an opening in the horizontal arm of a flange 110, the vertical arm of which is affixed to the base 92. A compression spring 112 is positioned between the lower surface of the horizontal arm of the flange 110 and the upper surface of the yoke 106 to bias the idler roller 104 in a downward direction. The continuous strip 84 of bait is fed between the idler roller and the toothed roller. The idler roller 104 therefore serves to maintain engagement between the strip 84 and the toothed roller so that positive advancement will occur upon rotation of the tooth roller.

A brake mechanism 120 is mounted on the flange 90 to engage the periphery of the reel 86 for the purpose of placing drag on the reel to prevent overrotation of the reel as bait is fed to the baiting station. The brake mechanism includes a brake arm 122 pivotally mounted on the upper end of flange 90. One end of the arm extends over the reel and carries a brake pad 124 between the arm and an annular peripheral flange 126 on the reel. The other end of the arm 122 extends beyond the opposite side of the flange from the reel. A retaining flange 128 is located below the other end of the arm and affixed by a conventional fastener to the main flange 90. A coil spring 130 is placed in compression between the other end of the brake arm and the retaining flange. The spring braces the other end of the arm upwardly, in turn forcing the brake pad into engagement with the reed flange 126. A bolt 132 runs from the retaining flange upwardly through the coil spring and through the enlarged opening in the other end of the brake arm. A thumb screw 134 is threaded on the upper end of the bolt. By adjusting the position of the thumb screw, the amount of force exerted by the brake pad on the wheel flange can be adjusted.

When the baiting machine calls for an incremental piece of bait to be advanced to the baiting station 82, the actuating mechanism 114 for the tooth roller 102 causes the tooth roller to rotate an appropriate amount to advance the continuous strip of bait into the baiting station. Thereafter, a signal is sent to the prime mover for the reciprocating knife, causing the knife to reciprocate downwardly and sever the next incremental portion of bait from the continuous strip 84. Alternatively the bait can be laterally perforated to divide the strip into bait size pieces. The action of the baiting machine removing the bait from the baiting station can then be used to sever the bait size piece at the perforation line.

This embodiment of the invention provides a means for feeding a continuous bait strip to a baiting station, thus allowing the most compact and efficient packaging for artificial bait to be employed, and at the same time providing a very simple, economical, and easy-to-maintain bait feeding system.

The present invention has been described in conjunction with several embodiments of the invention. One of ordinary skill, after reading the foregoing specification, can make various changes, substitutions of equivalents, and other alterations to the embodiments shown without departing from the broad concepts disclosed herein. It is therefore intended that the Letters Patent granted hereon be limited only by the definitions named in the appended claims and equivalents thereof.

The embodiments of the invention in which an exclusive property or privilege is claimed are defined as follows:

1. An apparatus for feeding artificial bait to a baiting station comprising:
   means for holding a stack of bait pieces adjacent a baiting station having means for guiding a fish hook through said baiting station, said having a first end and an opening adjacent said first end for allowing a piece of bait to be moved transversely from the end of the stack adjacent the first end;
   means for moving said piece of bait transversely from the stack and transferring it to a baiting station; and,
   means for biasing said stack of bait toward said first end so that when the piece of bait adjacent said first end is removed, the stack will index toward said first end to replace the just-removed piece of bait.

2. The apparatus of claim 1, wherein said means for moving comprises a reciprocating plunger.

3. The apparatus of claim 1, wherein said means for holding comprises a stack in a generally upright position, said means for biasing comprising a weight position on top of said stack.

4. The apparatus of claim 1, wherein said means for holding comprises a tubular member having a rectangular cross-section.

5. The apparatus of claim 1, wherein said means for holding comprises a magazine that is elongated in the direction of removal of bait pieces, said means for holding being constructed to receive a stack of elongated bait pieces.

6. An apparatus for feeding artificial bait to a baiting station comprising:
   means for holding a stack of bait pieces adjacent a baiting station having a means for guiding a fish hook through said baiting station, said means for holding having a first end and an opening adjacent said first end for allowing a piece of bait to be moved transversely from the end of the stack adjacent the first end, said means being elongated in the direction of removal of bait pieces, said means being constructed to receive a stack of elongated bait pieces;
   means for moving said piece of bait from the stack and transferring it to the baiting station including an endless belt positioned below said first end and running between said bottom and said baiting station; and,
   means for biasing said stack of bait toward said first end so that when the piece of bait adjacent said first end is removed, the stack will index toward said first end to replace the just-removed piece of bait.

7. An apparatus for feeding artificial bait to a baiting station comprising:
   means for holding a stack of bait pieces adjacent a baiting station having a means for guiding a fish hook through said baiting station, said means for holding having a first end and an opening adjacent said first end for allowing a piece of bait to be moved transversely from the end of the stack adjacent said first end, said means being elongated in the direction of removal of bait pieces, said means for holding being constructed to receive a stack of elongated bait pieces;
   means for moving said piece of bait from the stack and transferring it to a baiting station;
   means for biasing said stack of bait toward said first end so that when the piece of bait adjacent said first end is removed, the stack will index toward said first end to replace the just-removed piece of bait; and,
   a knife means positioned adjacent said baiting station for cutting incremental pieces of bait from an elongated strip being fed to said baiting station by said means for moving.

* * * * *

UNITED STATES PATENT AND TRADEMARK OFFICE
CERTIFICATE OF CORRECTION

PATENT NO. : 4,787,165

DATED : November 29, 1988

INVENTOR(S) : Harold T. Cook, Jr.

It is certified that error appears in the above-identified patent and that said Letters Patent is hereby corrected as shown below:

Column 3, line 18: "stoop" should be --stop--
Column 4, line 46: "with" should be --which--

Signed and Sealed this

Twenty-first Day of November, 1989

Attest:

JEFFREY M. SAMUELS

Attesting Officer     Acting Commissioner of Patents and Trademarks